United States Patent

Meier et al.

[11] Patent Number: 5,999,426
[45] Date of Patent: Dec. 7, 1999

[54] CIRCUITRY FOR VOLTAGE POLE REVERSAL

[75] Inventors: Thomas Meier, München, Germany; Klaus Jürgen Schöpf, Chandler, Ariz.

[73] Assignee: Siemens Aktiengesellschaft, Munich, Germany

[21] Appl. No.: 09/202,337

[22] PCT Filed: Jun. 9, 1997

[86] PCT No.: PCT/DE97/01157

§ 371 Date: Dec. 14, 1998

§ 102(e) Date: Dec. 14, 1998

[87] PCT Pub. No.: WO97/48160

PCT Pub. Date: Dec. 18, 1997

[30] Foreign Application Priority Data

Jun. 14, 1996 [DE] Germany .................. 196 23 828

[51] Int. Cl.$^6$ .................. H02M 7/02; H02M 7/122
[52] U.S. Cl. .................. 363/63; 363/56; 323/222
[58] Field of Search .................. 323/222, 282, 323/210; 363/56, 53, 63, 21

[56] References Cited

U.S. PATENT DOCUMENTS

| | | | |
|---|---|---|---|
| 3,863,138 | 1/1975 | Lace | 322/28 |
| 4,045,719 | 8/1977 | Salzer | 363/89 |
| 4,281,377 | 7/1981 | Evans | 363/63 |
| 4,320,447 | 3/1982 | Krauss | 363/63 |
| 4,922,401 | 5/1990 | Lipman | 363/58 |
| 5,396,165 | 3/1995 | Hwang et al. | 323/210 |

OTHER PUBLICATIONS

Halbleiter Schaltungstechnik, U Tietz, Springer–Verlag Berlin, New York 1974 pp. 34–36.

Electronics Letters—Jun. 8, 1995, vol. 31, No. 12, pp. 933–935ds, Turner, pp. 931–935.

*Primary Examiner*—Peter S. Wong
*Assistant Examiner*—Rajnikant B. Patel
*Attorney, Agent, or Firm*—Hill & Simpson

[57] ABSTRACT

A circuit arrangement for producing an output voltage with a first polarity with respect to a reference-earth potential from an operating voltage with a second polarity with respect to the reference potential. The circuit arrangement operates on the basic principle that a first capacitor is charged, by means of a voltage rise on a coil after current has been removed from it, to a voltage which is positive with respect to the fixed reference-earth potential. During the on-phase of a transistor, the first capacitor charges a second capacitor to a voltage which is negative with respect to the fixed reference-earth potential and can be picked off from the outside. An electrical resistor is connected between the circuit output connection and the control line of the transistor.

9 Claims, 2 Drawing Sheets

CIRCUITRY FOR VOLTAGE POLE REVERSAL

BACKGROUND OF THE INVENTION

1. Field of the Invention

The present invention relates, generally, to a circuit arrangement for producing an output voltage of opposite polarity to the operating voltage, and a circuit arrangement which operates at a particularly low current level.

It also relates, in particular, to a circuit arrangement which, in an electronic device supplied with a battery voltage (for example), in a mobile radio set (mobile telephone) or a portable computer (laptop), produces a negative voltage from a positive voltage.

2. Description of the Prior Art

Circuit arrangements of this type are generally known. They are used, for example, in mobile radio sets which are supplied with a battery voltage and have one or more MMIC (Monolithic Microwave Integrated Circuit) Chips (for example, an MMIC power amplifier) based on MESFET technology, to produce a negative gate bias voltage for the MESFET(s). In the case of a first circuit variant, using which a negative voltage can be produced in a battery-powered electronic device, an AC voltage is produced by means of an oscillator or multivibrator, and is subsequently rectified. In the case of mobile telephones, it is likewise possible to produce a negative voltage by rectifying a received radio-frequency signal which is applied to the input of an MMIC power amplifier.

However, both of these methods have disadvantages. For example, in the case of the option mentioned first, an additional AC signal is produced by the oscillator in the electronic device which can adversely affect the operating characteristics of the device. For example, adjacent components in the electronic device, such as microprocessors, can be influenced, and this can lead to malfunctions.

In the case of the second method mentioned, it is particularly disadvantageous that the MMIC power amplifier is not switched on until after the radio-frequency signal has been applied, and can be operated only at relatively high signal levels.

SUMMARY OF THE INVENTION

The present invention is thus direct to developing a low-noise circuit arrangement of the type mentioned initially by means of which any adverse effect on the operating characteristics of an electronic device is reduced, and which can at the same time be produced cost-effectively and in a space-saving manner. Further, this circuit arrangement is intended to be suitable, in particular, for use in a mobile radio set, and to operate at particularly low current levels, while avoiding the disadvantages mentioned above.

This object is achieved by a circuit arrangement which includes a coil coupled between a first connection of a load path of a transistor, in particular a source-drain path of a field effect transistor, and a first circuit input connection, as well as between a second connection of the load path of the transistor and a fixed reference-earth potential. An operating voltage with a second polarity (for example, positive) with respect to the reference-earth potential can be applied to the first circuit input connection. Furthermore, a control connection of the transistor is coupled via a control line to a second circuit input connection, to which an AC voltage can be applied. A first capacitor is coupled between the first connection of the load path of the transistor and a cathode of a first diode, and the cathode of the first diode is coupled to an anode of a second diode. A cathode of the second diode is coupled to the fixed reference-earth potential, while a second capacitor is coupled between the fixed reference-earth potential and an anode of the first diode. The anode of the first diode is connected to a circuit output connection, at which an output voltage can be picked off with a first polarity (for example, negative) with respect to the fixed reference-earth potential.

The circuit arrangement according to the present invention operates on the basic principle that the first capacitor is charged, to a voltage which is positive with respect to the fixed reference-earth potential, by means of a voltage rise on the coil after the transistor has been switched off. During an on-phase of the transistor, the first capacitor charges the second capacitor to a voltage which is negative with respect to the fixed reference-earth potential and can be picked off from the outside.

The AC voltage consists of, for example, voltage pulses with a second polarity with respect to the fixed reference-earth potential; in particular, of a square-wave voltage.

The circuit arrangement according to the present invention has the particular advantage that, compared to the prior art, it can be produced without any major component complexity and, thus, occupies a small amount of space. Except for the coil and the capacitors, all the components can be integrated in a simple manner on one MMIC chip.

In a mobile radio set, the ringing signal transmitter supply voltage, which is already present, is preferably used as the AC voltage for transistor controlling. In a similar manner, the loudspeaker voltage can be used in a laptop.

Therefore, no additional oscillator is required for operation of the circuit arrangement according to the present invention. The operating voltage and the AC voltage are generally already available in electronic devices and need not be produced specifically for the circuit arrangement.

In a preferred embodiment of the circuit arrangement according to the present invention, a square-wave voltage is used as the AC voltage. This advantageously allows very high voltage rises to be produced on the coil, as a result of which the efficiency of the circuit arrangement is improved.

In the case of a particularly preferred development of the circuit arrangement according to the present invention, an electrical resistor is connected between the circuit output connection and the control line of the transistor, via which electrical resistor the control connection of the transistor T is supplied with a negative voltage and therefore operates at a particularly low current level.

Furthermore, in the case of a preferred embodiment of the present invention, a current limiting resistor is connected in the control connection line (connection between the second circuit input connection and the control connection) of the transistor, and prevents the AC voltage from collapsing severely during operation.

Furthermore, a third capacitor can advantageously be connected in the control line which DC-decouples from the circuit arrangement a voltage source which produces the AC voltage.

In the case of a further advantageous development of the circuit arrangement according to the present invention, a fourth capacitor is coupled between the first circuit input connection and the fixed reference-earth potential. This results in a voltage source which supplies the positive operating voltage being AC-decoupled from the circuit.

Furthermore, an additional electrical resistor also can be connected between the second circuit input connection and/ or the third capacitor and the fixed reference-earth potential. This advantageously stabilizes the potential at the control connection of the transistor with respect to the fixed reference-earth potential. Both a field effect transistor and a bipolar transistor can be used as the transistor.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
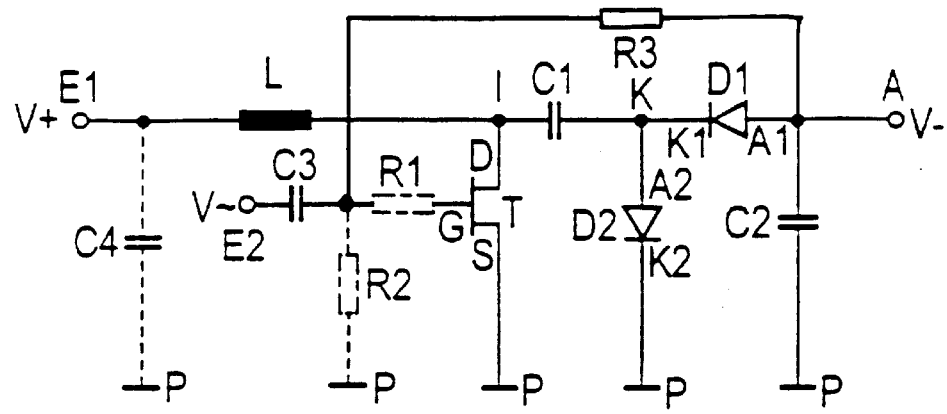
FIG. 1 shows a circuit diagram of an embodiment of a circuit arrangement according to the present invention.

In the case of the circuit arrangement in FIG. 1, a transistor T is, for example, a field effect transistor. A coil L (for example, with an inductance of 10 $\mu$H) is connected between a drain connection D (which corresponds to the above first connection of the load path) of the transistor T and a first circuit input connection E1, to which a positive operating voltage V+ (for example +3V) is applied. A source connection S (which corresponds to the above second connection of the load path) of the transistor T is connected to a fixed reference-earth potential P (for example, earth), and a gate connection G (which corresponds to the above control connection) of the transistor T is connected to a second circuit input connection E2, to which an AC voltage V AC (for example, a square-wave voltage with square-wave pulses of +3V, see FIG. 2) is applied. A first capacitor C1 (for example, with a capacitance of about 1 nF) is connected between the drain connection D and a cathode K1 of a first diode D1. At the same time, the cathode K1 of the first diode D1 is connected to an anode A2 of a second diode D2, and a cathode K2 of the second diode D2 is connected to the fixed reference-earth potential P. A second capacitor C2 (for example, with a capacitance of about 1 nF) is connected between the fixed reference-earth potential P and an anode A1 of the first diode D1. The anode A1 of the first diode D1 is connected to a circuit output connection A, on which a negative voltage V− (about −6 to −9 V with the inductance and capacitance values stated) can be picked off.

Optionally, in the case of the circuit arrangement in FIG. 1, a gate bias resistor R1 (current limiting resistor) of, for example, R=1 kΩ can be connected (indicated by dashed lines in FIG. 1) in the gate supply line (connection between the gate connection G and the second circuit input connection E2). This prevents any possible severe collapse of the AC voltage V AC.

Furthermore, an additional electrical resistor R2 (for example R=20 kΩ) can be coupled (indicated by dashed lines in FIG. 1) between the fixed reference-earth potential P and the second circuit input connection E2, which stabilizes the gate (G)—source (S) potential of the transistor T.

In order to DC-decouple the AC voltage (V AC) supply from the circuit arrangement, a third capacitor C3 (likewise shown by dashed lines in FIG. 1) with a capacitance of, for example, 1 nF can be connected between the second circuit input connection E2 and the gate connection G or the gate bias resistor R1.

Furthermore, in order to decouple the coil L from an operating voltage (V+) supply, a fourth capacitor C4 (once again shown by dashed lines in FIG. 1) with a capacitance of, for example, 2 nF can be connected between the first circuit input connection E1 and the fixed reference-earth potential P.

In order to supply the transistor T with a negative gate voltage, an electrical resistor R3 is connected between the circuit output connection A and the gate connection G or the gate bias resistor R1. This allows the circuit arrangement to be operated at particularly low current levels.

Figure 2:
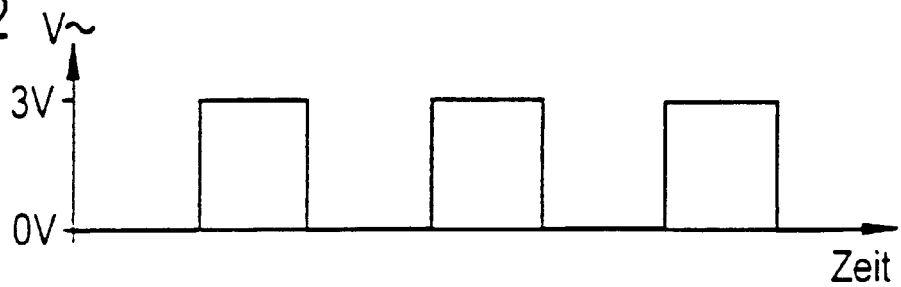
FIG. 2 shows a schematic illustration of a voltage-time diagram of an AC voltage for controlling the transistor.

FIG. 2 shows a voltage-time diagram for an AC voltage V AC as can be used for driving the transistor T and is available, for example, in a mobile radio set (for example, a mobile telephone) as a ringing signal transmitter supply voltage $V_{clk}$. Time is plotted on the abscissa, and a voltage V on the ordinate. This voltage is a square-wave voltage with a pulse level of, for example, +3V with respect to the fixed reference-earth potential P (for example, earth), and a frequency of, for example, between 5 and 15 MHz, and is applied to the second circuit input connection E2.

Figure 3:
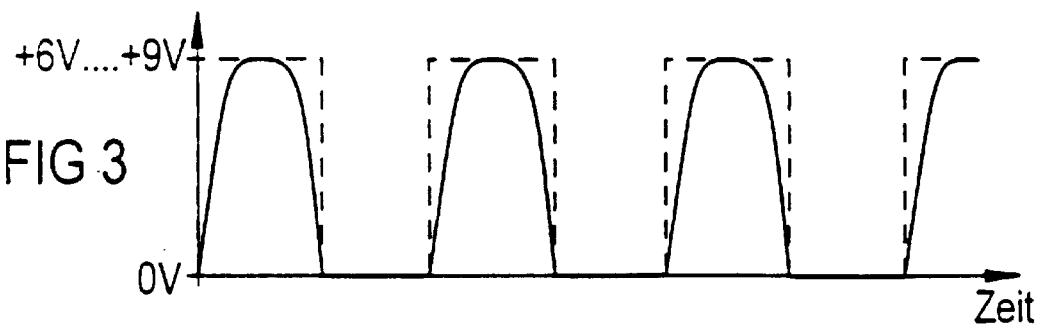
FIG. 3 shows a schematic illustration of a voltage-time diagram of the voltage waveform at the node, marked by I in the circuit arrangement in FIG. 1.

The voltage-time diagram illustrated in FIG. 3 shows schematically the voltage waveform at the node designated I in the circuit arrangement illustrated in FIG. 1. Similar to FIG. 2, time is plotted on the abscissa and a voltage V on the ordinate. Accordingly, a voltage which is higher than the operating voltage V+ with respect to the reference potential P, and has a maximum from about +6 to +9V, is applied to the node I during the pulse pauses in the AC voltage V AC or in the ringing signal transmitter supply voltage $V_{clk}$. Since the transistor T is switched on, the node I is at the fixed reference-earth potential P during the pulses. The voltage which is higher than the operating voltage V+ is produced by a voltage rise occurring when the current to the coil L is switched off, which voltage rise charges the first capacitor C1. The ideal voltage waveform is shown by dashed lines in FIG. 3.

Figure 4:
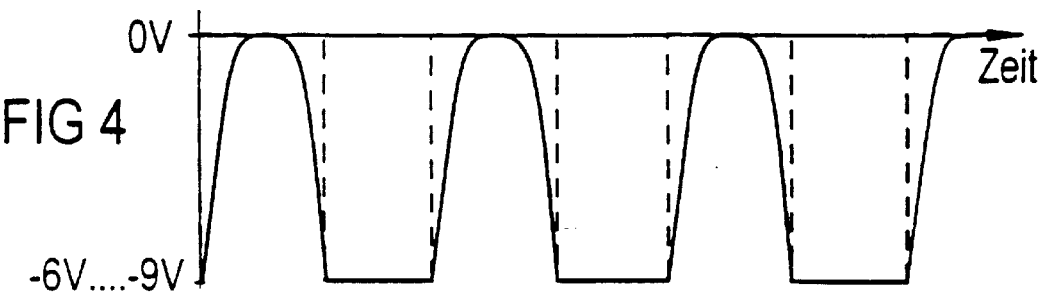
FIG. 4 shows a schematic illustration of a voltage-time diagram of the voltage waveform at the node, marked by K in the circuit arrangement in FIG. 1.

The voltage-time diagram illustrated in FIG. 4 schematically illustrates the voltage waveform at the node designated K in FIG. 1. Once again, similar to FIG. 2, time is plotted on the abscissa and a voltage V on the ordinate. A voltage with a maximum from about −6 to −9V with respect to the fixed reference-earth potential is in this case present during the pulse pauses in the AC voltage V AC or in the ringing signal transmitter supply voltage $V_{clk}$. This voltage is produced by the fact that, when the transistor T is switched on and the positive pole of the first capacitor C1 is thus connected to the fixed reference-earth potential, the second capacitor C2 is charged to a voltage V− which is negative with respect to the fixed reference-earth potential. The ideal voltage waveform is once again indicated by dashed lines in FIG. 4.

In the unloaded state, a pure DC voltage from about −6 to −9V can be picked off at the circuit output connection A.

Figure 5:
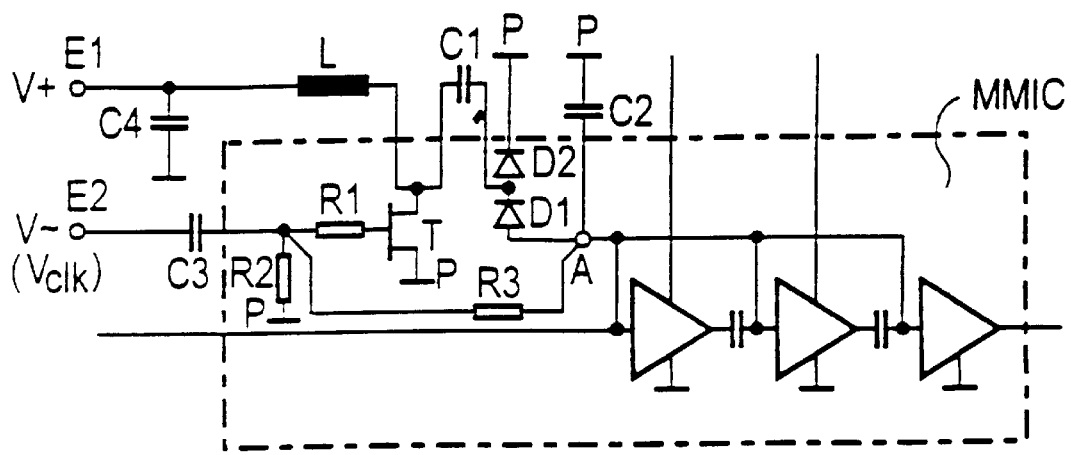
FIG. 5 shows a block diagram of the circuit arrangement according to the present invention in conjunction with an MMIC power amplifier.

In the block diagram of FIG. 5, illustrated the circuit arrangement of the present invention is shown in conjunction with an MMIC power amplifier chip MMIC which has three amplifier stages V1, V2, V3 and can be used, for example in a mobile radio set, it can be seen that the transistor T, the diodes D1 and D2 and, where appropriate, the first, the second and/or the third electrical resistors R1, R2, R3 are integrated on the MMIC power amplifier chip MMIC. The coil L, the first capacitor C1 and the second capacitor C2, if appropriate as well as the third capacitor C3 and the fourth capacitor C4, are arranged such that they are not on the MMIC power amplifier chip MMIC. This block diagram furthermore shows that the ringing signal transmitter supply voltage $V_{clk}$, which is in principal present in a mobile radio set, can be used as the AC voltage V AC in the circuit arrangement according to the present invention.

Although the present invention has been described with reference to specific embodiments, those of skill in the art will recognize that changes may be made thereto without departing from the spirit and scope of the invention as set forth in the hereafter appended claims.

We claim as our invention:

1. A circuit arrangement for producing an output voltage with a first polarity with respect to a reference-earth potential in an electronic device which is supplied with an operating voltage with a second polarity with respect to the reference-earth potential, the circuit arrangement comprising:

a coil coupled between a first connection of a load path of a transistor and a first circuit input connection, the operating voltage applied to the first circuit input connection;

a second connection of the load path of the transistor coupled to the fixed reference-earth potential;

a control connection of the transistor coupled to a second circuit input connection to which an AC voltage can be applied; and a first diode and a second diode, wherein a first capacitor is coupled between the first connection of the load path of the transistor and a cathode of the first diode, the cathode of the first diode is coupled to an anode of the second diode, a cathode of the second diode is coupled to the first reference-earth potential, a second capacitor is coupled between the fixed reference-earth potential and an anode of the first diode, and the anode of the first diode is connected to a circuit output connection at the output voltage.

2. A circuit arrangement as claimed in claim 1, further comprising:

an electrical resistor coupled between the circuit output connection and the control line of the transistor.

3. A circuit arrangement as claimed in claim 2, wherein the transistor, the first diode, the second diode and the electrical resistor are integrated on a single MMIC chip.

4. A circuit arrangement as claimed in claim 1, wherein the transistor, the first diode and the second diode are integrated on a single MMIC chip.

5. A circuit arrangement as claimed in claim 1, further comprising a third capacitor connected between the first circuit input connection and the fixed reference-earth potential.

6. A circuit arrangement as claimed in claim 1, further comprising a current limiting resistor arranged upstream of the control connection of the transistor.

7. A circuit arrangement as claimed in claim 1, further comprising a further electrical resistor connected between the second circuit input connection and the fixed reference-earth potential.

8. A circuit arrangement as claimed in claim 1, wherein the AC voltage is a square-wave voltage consisting of voltage pulses with a second polarity with respect to the reference-earth potential.

9. A circuit arrangement as claimed in claim 1, wherein the circuit arrangement is used it a mobile radio set such that a ringing signal transmitter supply voltage produced in the mobile radio set is used as the AC voltage.

* * * * *